United States Patent

[11] 3,617,170

| [72] | Inventors | Guenter Hansen<br>Ludwigshafen;<br>Hans-Richard Mueller, Fussgoenheim, both of Germany |
|---|---|---|
| [21] | Appl. No. | 875,506 |
| [22] | Filed | Nov. 10, 1969 |
| [45] | Patented | Nov. 2, 1971 |
| [73] | Assignee | Badische Anilin - & Soda-Fabrik Aktiengesellschaft Ludwigshafen (Rhine) Ludwigshafen, Rhineland-Pfalz, Germany |
| [32] | Priority | Nov. 20, 1968 |
| [33] | | Germany |
| [31] | | P 18 09 949.5 |

[54] PROCESS FOR DYEING AND PRINTING POLYESTER TEXTILE MATERIALS WITH AZLACTONE DYES AND MIXTURES OF AZLACTONE DYES
3 Claims, No Drawings

[52] U.S. Cl.................................................. 8/25,
8/179, 260/240 F
[51] Int. Cl................................................... D06p 3/52
[50] Field of Search.................................... 260/307 A,
240 F; 8/179, 25

[56] References Cited
UNITED STATES PATENTS
3,449,329  6/1969  Wildi........................... 260/240 F

*Primary Examiner*—George F. Lesmes
*Assistant Examiner*—T. J. Herbert, Jr.
*Attorney*—Johnston, Root, O'Keeffe, Keil, Thompson and Shurtleff

ABSTRACT: Process for dyeing synthetic polyester textile material with dyes of the azlactone series in fast and brilliant yellow shades.

PROCESS FOR DYEING AND PRINTING POLYESTER TEXTILE MATERIALS WITH AZLACTONE DYES AND MIXTURES OF AZLACTONE DYES

The invention relates to a process for dyeing polyesters with dyes having the general formula (I):

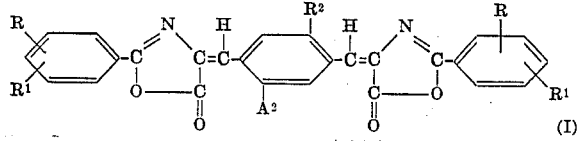

(I)

where R denotes a hydrogen, chlorine or bromine atom, or a methyl, ethyl, methoxy or ethoxy group; $R^1$ denotes a hydrogen or chlorine atom or a methyl or methoxy group and $R^2$ denotes a hydrogen, chlorine or bromine atom or a methyl, ethyl, methoxy or ethoxy group.

Radicals attached to the phenyl rings and having the same designation may be identical or different.

Dyes having the formula (I) are yellow and are suitable for dyeing textile material of synthetic polyesters such as polyethylene glycol terephthalate, 1,4-dimethylolcyclohexane terephthalate or compounds having similar chemical constitutions. The use of mixtures of dyes having the formula (I) is of particular industrial interest.

The high temperature and thermosol methods are particularly suitable as dyeing methods but in the case of mixtures of dyes it is possible to dye at temperatures of about 100° C. using carriers. Conventional assistants may be added during dyeing and in other respects dyeing is carried out by conventional, generally known methods.

Dyeings on polyester material are distinguished by brilliance and outstanding fastness properties. Their fastness to light and to dry-heat pleating and setting may be particularly emphasized.

The dyes are generally used in amounts of from 0.01 to 2 percent with reference to the weight of the textile material.

A group of particularly suitable dyes has the general formula (II):

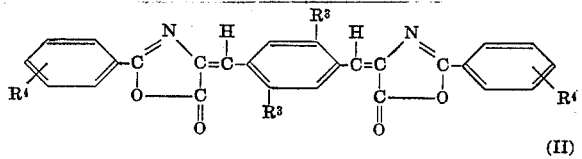

(II)

where $R^3$ denotes a hydrogen or chlorine atom or a methoxy group and $R^4$ denotes a hydrogen atom or a methyl or methoxy group.

Dyes in which $R^3$ denotes a hydrogen atom are preferred.

Production of the dyes having the formula (I) may be carried out for example by reacting a terephthalaldehyde having the formula (III):

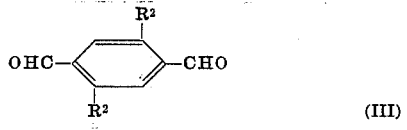

(III)

with a hippuric acid having the formula (IV):

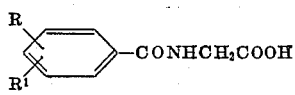

The reaction has no peculiarities as compared with reactions of aldehydes with hippuric acid known from the literature.

The following examples illustrate the invention.

The parts and percentages in the following examples are by weight unless stated otherwise.

EXAMPLE

One hundred parts of a polyethylene glycol terephthalate cloth is dyed at the boiling temperature for 90 minutes in a liquor which contains 0.5 part of the finely divided dye having the formula:

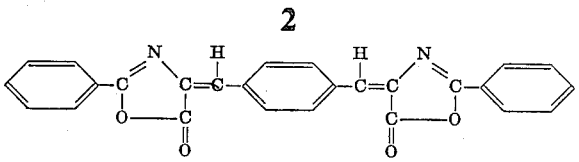

and 4 parts of finely divided o-phenylphenol in 3,000 parts of water. The cloth is then rinsed thoroughly and then treated for 15 minutes at 95° C. in a liquor which contains 6 parts of soap and 4 parts of 32 percent caustic soda solution in 3,000 parts of water. A greenish yellow, brilliant dyeing is obtained having very good light, wet and thermal fastness properties. The dye having the said formula is obtained as follows:

One hundred thirty-four parts of terephthalaldehyde and 394 parts of hippuric acid are introduced into 449 parts of acetic anhydride and heated to about 90° C. The mixture heats up to about 120° C. by the reaction which takes place.

After having stirred the mixture at from 100° to 110° C. for 1 hour, 400 parts of water is allowed to flow in within 30 minutes and stirring is continued for another 15 minutes at 90° C. The mixture is then suction filtered at a temperature of 70° C., and the residue is washed with 200 parts of water at 70° C. and then dried at 100° C.

Four hundred eighteen parts of a reddish yellow product is thus obtained which is soluble in dimethylformamide and N-methylpyrrolidone.

EXAMPLE 2

One hundred parts of polyethylene glycol terephthalate filaments is dyed for 1 hour at 130° C. in a pressure vessel in a liquor which contains 1 part of the finely divided dye having the formula:

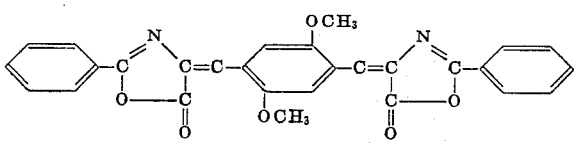

and 2 parts of the product obtained by reaction of 1 mole of sperm oil alcohol with 80 moles of ethylene oxide followed by sulfonation, in 1,500 parts of water.

A reddish yellow dyeing having excellent fastness properties is thus obtained.

The dye having the said formula is prepared as follows:

36.0 parts of hippuric acid and 19.4 parts of 2,5-dimethoxyterephthalaldehyde are heated together with 90 parts of acetic anhydride and 9 parts of anhydrous sodium acetate at the boiling point under reflux for 1 hour while stirring. After cooling and suction filtration, the reaction product is washed with 100 parts of methanol, then with 200 parts of water and finally with 100 parts of methanol and dried at 80° C. in a drying cabinet. Thirty-seven parts of an orange yellow powder is obtained which dissolves in dimethylformamide with a yellow color.

When 42.0 parts of p-methoxybenzoylglycine is used instead of 36.0 parts of hippuric acid, the procedure otherwise being the same, 34.6 parts of an orange powder is obtained which is insoluble in water and which dyes in brilliant neutral yellow shades having excellent fastness by the said methods.

EXAMPLE 3

Polyester cloth is padded with a liquor which contains 15 parts of the dye having the formula:

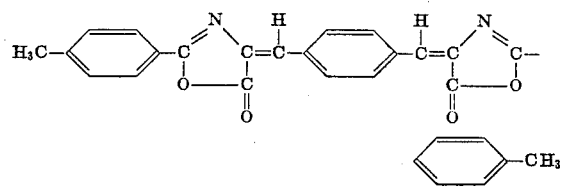

20 parts of a sodium polyacrylate and 2 parts of an adduct of 47 moles of ethylene oxide to castor oil in 1,000 parts of water. The cloth is then dried and thermosolled for 60 seconds at 200° C. with hot air. Following a reductive afterpurification, a brilliant yellow dyeing is obtained which has excellent fastness properties.

The dye having the formula given may be obtained as follows:

36.8 parts of p-methylbenzoylglycine, 13.4 parts of terephthalaldehyde, 90 parts of acetic anhydride and 9 parts of anhydrous sodium acetate are boiled together for 1 hour while stirring. The azlactone dye is precipitated after only a short time. The dye is isolated as described in example 1 and 31.4 parts of a yellow brown powder is obtained which dissolves in N-methylpyrrolidone with a yellow color.

When 42.7 parts of p-chlorobenzoylglycine is used instead of 38.6 parts of p-methylbenzoylglycine and the procedure is otherwise as described, 39.2 parts of a yellow brown dye is obtained which gives dyeings having similar fastness properties on polyesters.

In accordance with the said methods, very fast greenish to reddish yellow dyeings are obtained on polyesters with the dyes identified in the following table by the substituents:

TABLE

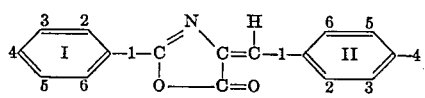

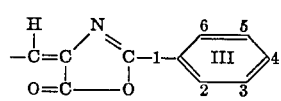

| Example | Ring I | Ring II | Ring III |
|---|---|---|---|
| 4 | 4-OCH₃ | | 4-OCH₃ |
| 5 | 3-OCH₃ | | 3-OCH₃ |
| 6 | 4-Br | | 4-Br |
| 7 | 4-OC₂H₅ | | 4-OC₂H₅ |
| 8 | 2,4-CH₃ | | 2,4-CH₃ |
| 9 | 4-C₂H₅ | | 4-C₂H₅ |
| 10 | 4-CH₃ | 2,5-OCH₃ | 4-CH₃ |
| 11 | 4-Cl | 2,5-OCH₃ | 4-Cl |
| 12 | | 2,5-Cl | |
| 13 | 4-CH₃ | 2,5-Cl | 4-CH₃ |
| 14 | 4-OCH₃ | 2,5-Cl | 4-OCH₃ |

It may be advantageous to use mixtures of dyes instead of the individual compounds for dyeing. These mixtures may also be obtained by using different terephthalaldehydes and/or hippuric acids in the synthesis of the dyes.

EXAMPLE 15

In a manner analogous to those described in examples 2 and 3, polyethylene glycol terephthalate cloth is dyed with a mechanical mixture of the dyes having the formulas:

(a)

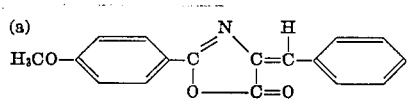

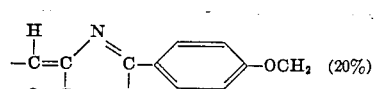 (20%)

and

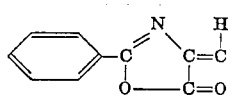

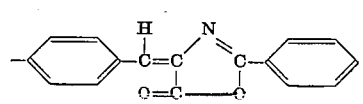 (80%)

or (b)

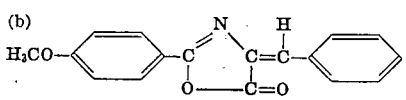

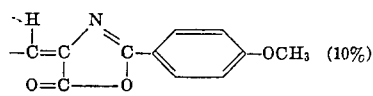 (10%)

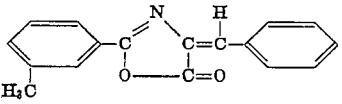

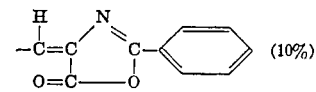 (10%)

and

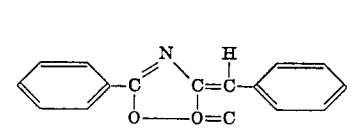

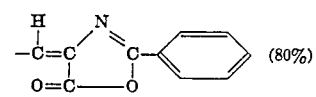 (80%)

Deeply colored brilliant yellow dyeings having excellent fastness properties are obtained.

EXAMPLE 16

One hundred parts of a polyethylene glycol terephthalate cloth is dyed for 90 minutes at boiling temperature in a liquid which contains 1.0 part of a finely divided mixture of the dyes having the formulas:

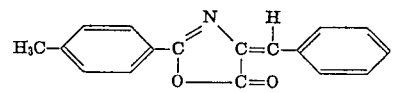

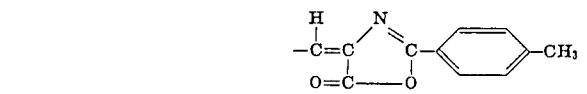

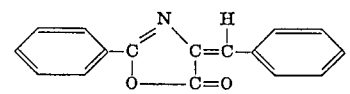

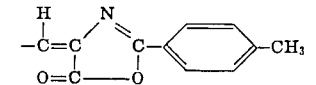

and

and 9 parts of finely divided o-phenylphenol in 3,000 parts of water. Then the dyed cloth is washed with water and reductively purified for 15 minutes at 85° C. in a liquor consisting of 3,000 parts by volume of water, 3 parts of sodium dithionite and 3 parts of 32 percent caustic soda solution and again washed with water. A greenish yellow brilliant dyeing is obtained having very good light, wet and thermal fastness properties.

The mixture of dyes is obtained as follows:

One hundred thirty-four parts of terephthalaldehyde, 179 parts of hippuric acid and 193 parts of p-methylhippuric acid are introduced into 600 parts of acetic anhydride and heated to 70° C. A strongly exothermic reaction is thus initiated and the mixture heats up to about 120° C. The whole is stirred for 1 hour at 100° to 110° C. and allowed to flow slowly within 30 minutes into 600 parts of water followed by stirring for another 30 minutes at 90° C. The mixture is then suction filtered at 70° C. and the residue is washed with 2,000 parts by volume of water and dried at 100° C.

Four hundred twenty-four parts of a reddish yellow product is obtained which is soluble in dimethylformamide and N-methylpyrrolidone.

When 248 parts of 2,4-dichlorobenzoylglycine is used instead of 193 parts of p-methylhippuric acid, the procedure being otherwise the same, 481 parts of an orange powder is obtained which is insoluble in water and which according to the methods described also gives brilliant greenish yellow dyeings having excellent fastness properties.

EXAMPLE 17

One hundred parts of polyethylene glycol terephthalate cloth is dyed for 90 minutes at boiling temperature in a dye liquor which contains 0.5 part of a finely divided mixture of the dyes having the formulas:

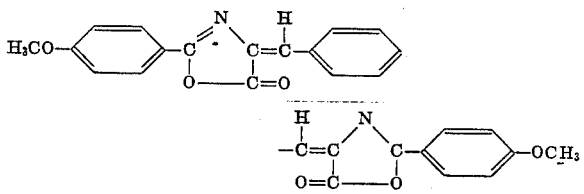

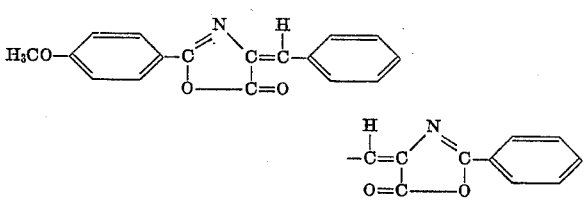

and

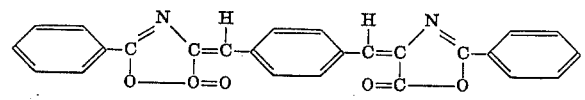

and 9 parts of finely divided O-phenylphenol in 3,000 parts of water. The dyed cloth is then reductively purified for 15 minutes at 85° C. in a liquor consisting of 3,000 parts of water, 3 parts of sodium dithionite and 3 parts of 32 percent caustic soda solution and again washed with water. A brilliant greenish yellow dyeing having very good general fastness properties is obtained.

The dye mixture having the above formulas is obtained in the following manner:

Forty-one and eight-tenths parts of 4-methoxybenzoylglycine, 322.0 parts of hippuric acid and 134.0 parts of terephthalaldehyde are introduced into 500 parts of acetic anhydride while stirring. The mixture is heated to about 100° C., the reaction taking place exothermally. The temperature of the reaction mixture rises in consequence to 120° to 125° C. within 30 minutes. At this temperature the whole is stirred for another 15 minutes. After cooling to 100° C., 1,000 parts of water at 80° C. is allowed to flow in. The product is suction filtered at 70° to 80° C., washed with 3,000 to 4,000 parts of water at 80° C. and dried at 90° C. under subatmospheric pressure.

Dyeings having similar shades are obtained by using according to the same dyeing method the dye mixtures obtained in a manner analogous to that described from the following starting materials:

a. 167.2 parts of m-methoxybenzoylglycine,
   215.0 parts of benzoylglycine and
   b 134.0 parts of terephthalaldehyde;
b. 193.0 parts of m-methylbenzoylglycine,
   179.0 parts of benzoylglycine and
   134.0 parts of terephthalaldehyde;
c. 154.0 parts of m-methylbenzoylglycine,
   215.0 parts of benzoylglycine and
   134.0 parts of terephthalaldehyde;
d. 116.0 parts of p-methylbenzoylglycine,
   250.0 parts of benzoylglycine and
   134.0 parts of terephthalaldehyde;
e. 308.8 parts of o-methylhippuric acid,
   68.4 parts of benzoylglycine and
   134.0 parts of terephthalaldehyde; or
f. 270.2 parts of o-methylhippuric acid,
   107.4 parts of benzoylglycine and
   134.0 parts of terephthalaldehyde.

We claim:

1. A process which comprises dyeing polyester textile materials with an azlactone dye having the formula:

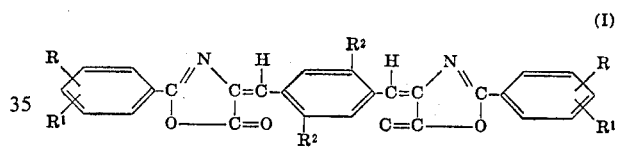

(I)

where R denotes a hydrogen, chlorine or bromine atom or a methyl, ethyl, methoxy or ethoxy group, $R^1$ denotes a hydrogen or chlorine atom or a methyl or methoxy group, and $R^2$ denotes a hydrogen, chlorine or bromine atom or a methyl, ethyl, methoxy or ethoxy group or mixtures thereof.

2. A process as claimed in claim 1 wherein the azlactone dye has the formula:

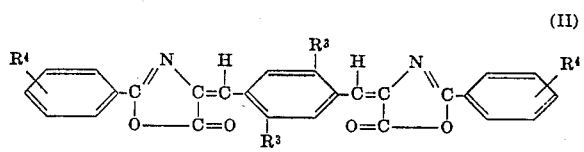

(II)

where $R^3$ denotes a hydrogen or chlorine atom or a methoxy group and $R^4$ denotes a hydrogen atom or a methyl or methoxy group.

3. A process as claimed in claim 1 wherein the dye is a mixture of the azlactone dyes.

* * * * *

PO-1050
(5/69)

UNITED STATES PATENT OFFICE
CERTIFICATE OF CORRECTION

Patent No. 3,617,170      Dated November 2, 1971

Inventor(s) Guenter Hansen and Hans-Richard Mueller

It is certified that error appears in the above-identified patent and that said Letters Patent are hereby corrected as shown below:

First page, left-hand column, ninth line, delete "Ludwigshafen (Rhine)".

Column 1, formula (I), that portion of the formula reading "$A^2$" should read -- $R^2$ --.

Column 5, lines 26 to 28, that portion of the formula reading
"$\underset{C \quad C}{N}$" should read -- $\underset{C \quad C}{N}$ --.

Column 6, line 11, "b 134.0" should read -- 134.0 --.

Signed and sealed this 30th day of May 1972.

(SEAL)
Attest:

EDWARD M.FLETCHER,JR.    ROBERT GOTTSCHALK
Attesting Officer    Commissioner of Patents